United States Patent [19]

Watanabe

[11] Patent Number: 4,933,753
[45] Date of Patent: Jun. 12, 1990

[54] PORTABLE IMAGE FORMING APPARATUS

[75] Inventor: Junji Watanabe, Yokohama, Japan

[73] Assignee: Kabushiki Kaisha Toshiba, Kawasaki, Japan

[21] Appl. No.: 278,332

[22] Filed: Nov. 29, 1988

[30] Foreign Application Priority Data

Nov. 30, 1987 [JP] Japan ................................ 62-302611
Nov. 30, 1987 [JP] Japan ................................ 62-302612
Nov. 30, 1987 [JP] Japan ................................ 62-302613
Nov. 30, 1987 [JP] Japan ................................ 62-302614
Nov. 30, 1987 [JP] Japan ................................ 62-302615

[51] Int. Cl.⁵ ............................................ H04N 1/46
[52] U.S. Cl. ................................. 358/75; 358/296; 358/494; 346/76 PH
[58] Field of Search ............... 358/75, 494, 497, 296; 346/76 PH; 355/27, 327, 234, 235

[56] References Cited

U.S. PATENT DOCUMENTS

| | | | |
|---|---|---|---|
| 4,525,748 | 6/1985 | Carbone | 358/472 |
| 4,641,980 | 2/1987 | Matsumoto et al. | 346/76 PH |
| 4,652,155 | 3/1957 | Hakoyama et al. | 346/76 PH |
| 4,760,405 | 7/1988 | Nagira et al. | 346/76 PH |
| 4,815,869 | 3/1989 | Van Dyck | 358/75 |
| 4,831,462 | 5/1989 | Alonyama et al. | 358/75 |
| 4,835,603 | 5/1989 | Kano et al. | 358/75 |
| 4,841,358 | 6/1989 | Kammoto et al. | 358/75 |
| 4,860,029 | 8/1989 | Iseda | 346/76 PH |

Primary Examiner—Howard Britton
Assistant Examiner—Kimyen Vu
Attorney, Agent, or Firm—Foley & Lardner, Schwartz, Jeffrey, Schwaab, Mack, Blumenthal & Evans

[57] ABSTRACT

A portable image forming apparatus includes an image data generator and an image forming element. The image data generator includes a scanner for scanning a document, a converter for converting light reflected from the document into an elecrical signal. The image forming element includes a thermal head for forming an image on an image receiving medium, which is conveyed by a conveyer, in accordance with the electrical signal. The thermal head is positioned above the conveyer.

13 Claims, 14 Drawing Sheets

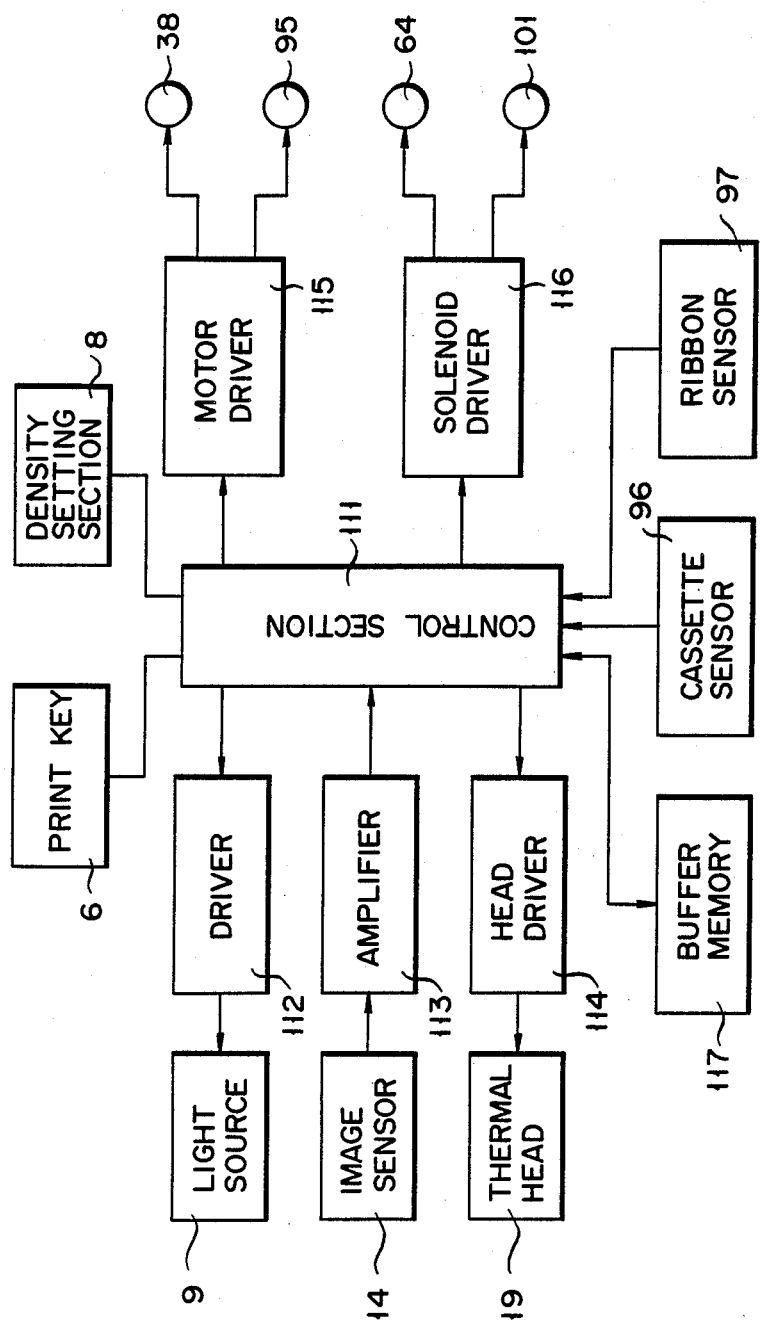
F I G. 24

PORTABLE IMAGE FORMING APPARATUS

BACKGROUND OF THE INVENTION

1. Field of the Invention

The present invention relates to an image forming apparatus and, more particularly, to a portable image forming apparatus constituted by a combination of e.g., an image sensor and a thermal printer.

2. Description of the Related Art

A scanner printer is used as a type of image forming apparatus. In this printer, a document is scanned by an image sensor to generate an electrical signal corresponding to a document image, and printing is performed by driving a head of a thermal printer in accordance with this electrical signal. The outer shape of such a printer is generally rectangular. In this printer, a color contact sensor (line sensor) is used as an image sensor. The color contact sensor is constituted by a CCD including R (red), G (green), and B (blue) filters or complementary color filters. Generally, this image sensor performs scanning once, and stores data obtained by this operation in a memory so as to generate desired image data. A thermal head of the thermal printer is arranged on the operator side so as to oppose a platen roller. Although paper serving as an image receiving member is reciprocated during color image printing, printing is performed only in one moving direction of the paper. Therefore, when printing of one cycle is completed, the paper is returned to a printing position, and printing is resumed from this position.

Such an image forming apparatus has the following drawbacks. For example, if the thermal head is arranged on the operator side of the platen roller, paper must be set by inserting it from the rear side of the platen roller, and must be removed from the operator side of the platen roller, thereby posing a problem that setting of paper is cumbersome. Moreover, since paper is returned to a printing position upon printing in only one direction so as to perform next printing, paper must be moved many times. Therefore, a time required to form a color image on a sheet of paper is inevitably increased. Accompanied with this problem, color misregistration tends to occur.

In order to eliminate the above-described drawbacks, a demand has been arisen for a portable image forming apparatus which can be manufactured at low cost.

SUMMARY OF THE INVENTION

It is, therefore, a principal object of the present invention to provide a portable image forming apparatus.

It is another object of the present invention to provide an image forming apparatus which can be manufactured at low cost.

It is still another object of the present invention to provide an image forming apparatus which is easy to use.

It is still another object of the present invention to provide a high-speed color image forming apparatus.

It is still another object of the present invention to provide a color image forming apparatus which is excellent in printing quality.

To achieve the above objects, there is provided an image forming apparatus for forming an image on an image carrier having a flat face, comprising means for generating image data, means for conveying the image carrier, and means for forming the image on the image carrier in accordance with the image data generated by the generating means, the forming means being detachably arranged above the conveying means.

BRIEF DESCRIPTION OF THE DRAWINGS

FIG. 24 is a view showing an arrangement of a control system of the image forming apparatus according to the present invention.

DETAILED DESCRIPTION OF THE PREFERRED EMBODIMENT

An embodiment of the present invention will be described with reference to the accompanying drawings.

Figure 1:
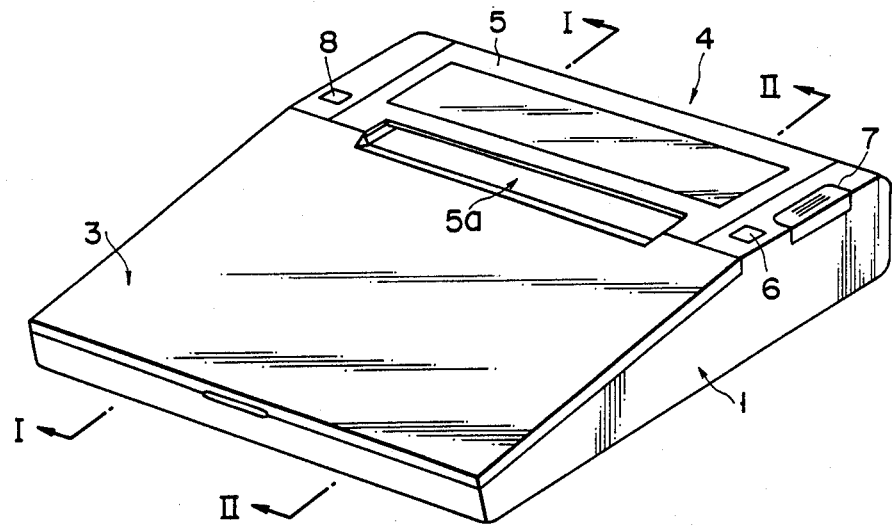
FIG. 1 is a perspective view showing an outer appearance of an image forming apparatus according to the present invention.
Figure 2:
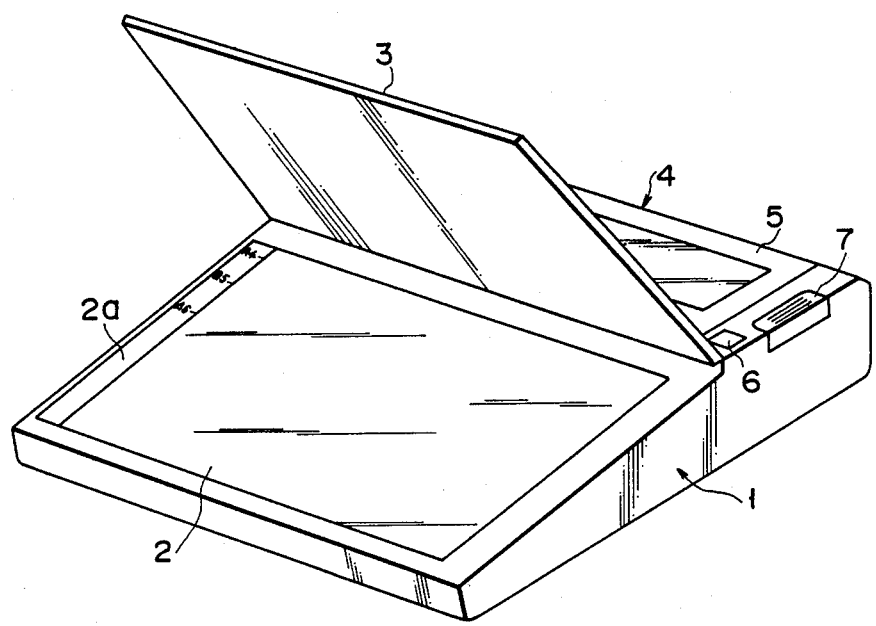
FIG. 2 is a perspective view showing a state wherein a document table cover of the image forming apparatus in FIG. 1 is open.

FIGS. 1 and 2 are schematic views showing art image forming apparatus, e.g., a scanner printer. An arrangement of the apparatus will be described below.

In FIG. 2, document table (transparent glass) 2 on which a document is placed is formed on the front side of the upper surface of image forming apparatus body (to be referred to as an apparatus body hereinafter) 1 so as to be inclined downward toward the front side. Stationary scale 2a used as a reference for setting a document is arranged on cassette table 2. In addition, openable document cover 3 is arranged near document table 2.

Referring to FIG. 1, printing section 4 is formed on a rear portion of apparatus body 1. Printing section 4 is covered with cover 5 pivotally mounted on apparatus body 1. Insertion port 5a is formed in cover 5 near the center of pivotal movement of document cover 3 so as to allow insertion of paper as an image receiving member. In addition, print key 6 and operating member 7 are formed in part of apparatus body 1 near one end of cover 5 in the longitudinal direction. Print key 6 designates the start of printing. Operating member 7 releases a locked state of a thermal head when multicolor printing (to be described later) is to be performed. In addition, for example, density setting section 8 for setting a printing density is formed on part of apparatus body 1 near the other end of cover 5 in the longitudinal direction.

Figure 3:
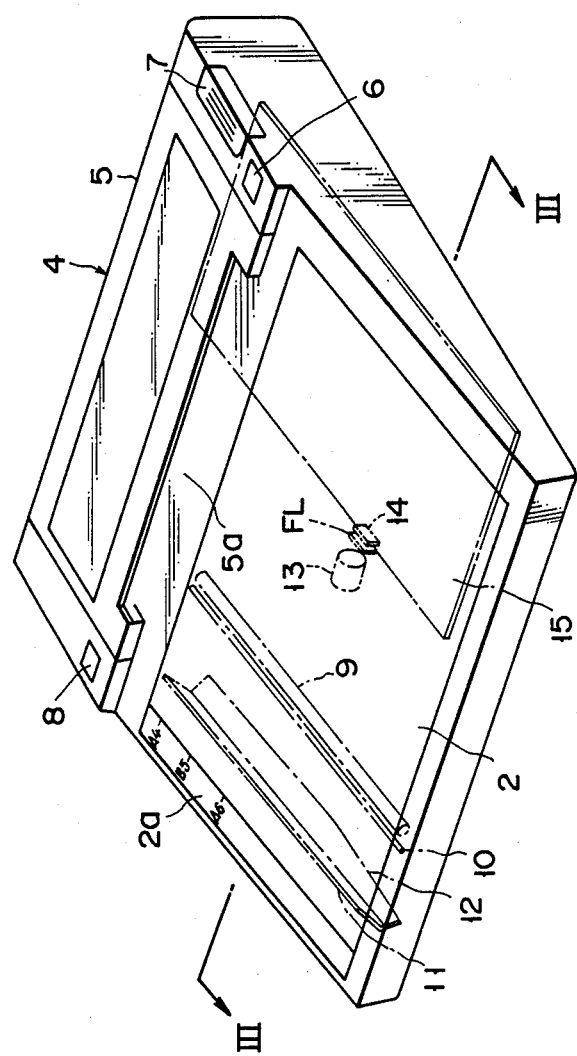
FIG. 3 is a view for explaining a relationship between a document table and an optical system of the image forming apparatus in FIG. 1.
Figure 4:
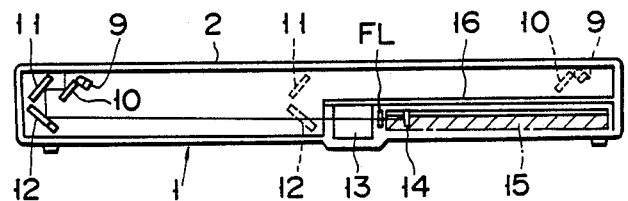
FIG. 4 is a sectional view taken along line III—III of FIG. 3.

FIG. 3 shows a state wherein document cover is detached from apparatus body 1. A document is placed on document table 2, and an optical system consisting of light source 9 constituted by, e.g., a light-emitting diode, and mirrors 10, 11, and 12 is reciprocated along the lower surface of document table 2 in directions indicated by arrows A and B (FIG. 4), thereby exposing/scanning the document. In this case, mirrors 11 and 12 are moved at a speed $\frac{1}{2}$ that of mirror 10 so as to maintain a certain length of an optical path. Driving means for this optical system will be described later.

Light emitted from light source 9 and reflected by the document is guided to lens block 13 through mirrors 10, 11, and 12. The light converged by lens block 13 is focused on image sensor 14 constituted by a CCD line sensor and is converted into an electrical signal. Filter unit FL is arranged between image sensor 14 and lens block 13. Filter unit FL can be freely moved in/out from the optical path by its up-and-down movement. Filter unit FL will be described in detail later.

An output signal from image sensor 14 is supplied to printing section 4 through a control section (to be described later) arranged on printed wiring board 15. Lens block 13, image sensor 14, and printed wiring board 15 are shielded from light by light shielding member 16 (FIG. 4) arranged in apparatus body 1.

Figure 5:
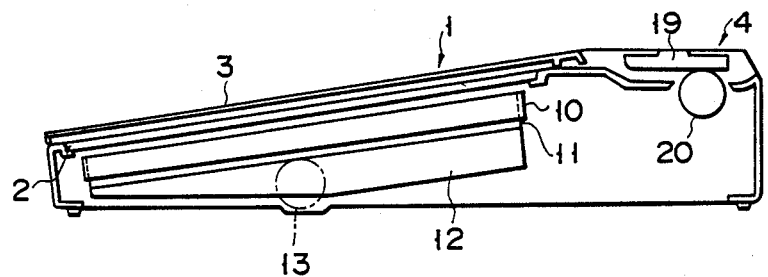
FIG. 5 is a sectional view taken along line I—I of FIG. 1.

FIG. 5 shows mirrors 10, 11, and 12. Mirror 12 for guiding light reflected by a document finally to lens block 13 is cut at a portion near the bottom of apparatus body 1. This cut portion is non-reflective. With this arrangement, document table 2, light source 9, and mirrors 10, 11, and 12 can be arranged so as to be inclined in accordance with the inclination of the cut portion of mirror 12, thereby contributing to reducing the profile of apparatus body 1.

Figure 6:
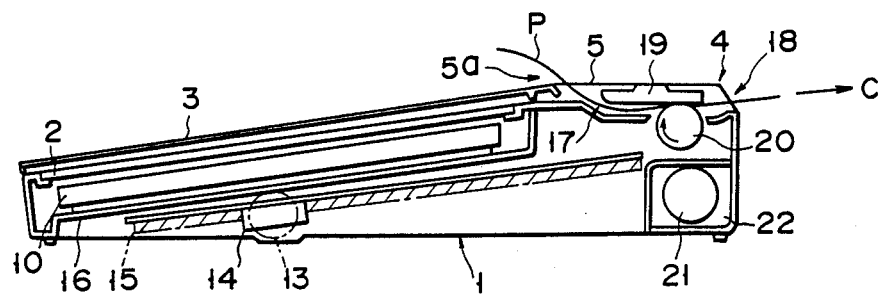
FIG. 6 is a sectional view taken along line II—II of FIG. 1.

Referring to FIG. 6, conveying path 17 is formed in apparatus body 1 on the side of printing section 4 so as to communicate with insertion port 5a. Paper discharge port 18 is formed in cover 5 so as to communicate with conveying path 17. Thermal head 19 is arranged midway along conveying path 17 along the moving direction of the optical system. A plurality of heating resistor elements 19j are arranged on thermal head 19 along the longitudinal direction. Platen roller 20 is urged against thermal head 19. Platen roller 20 is rotated by a driver (to be described later) in the direction indicated by an arrow in FIG. 6 during printing in accordance with the movement of the optical system. Consequently, paper (e.g., heat-sensitive paper) inserted from insertion port 5a into conveying path 17 is urged against thermal head 19 by platen roller 20 during printing and is moved in the direction indicated by arrow C in FIG. 6. In this state, a print signal is supplied from the above signal processing section to thermal head 19 so that an image corresponding the an image on the document set on document table 2 is printed on paper P. Paper P on which the image is formed in this manner is discharged from discharge port 18 upon rotation of platen roller 20.

Storage section 22 for storing battery 21 as a power source is formed in an inner bottom portion of apparatus body 1 on the side of printing 4.

Figure 7:
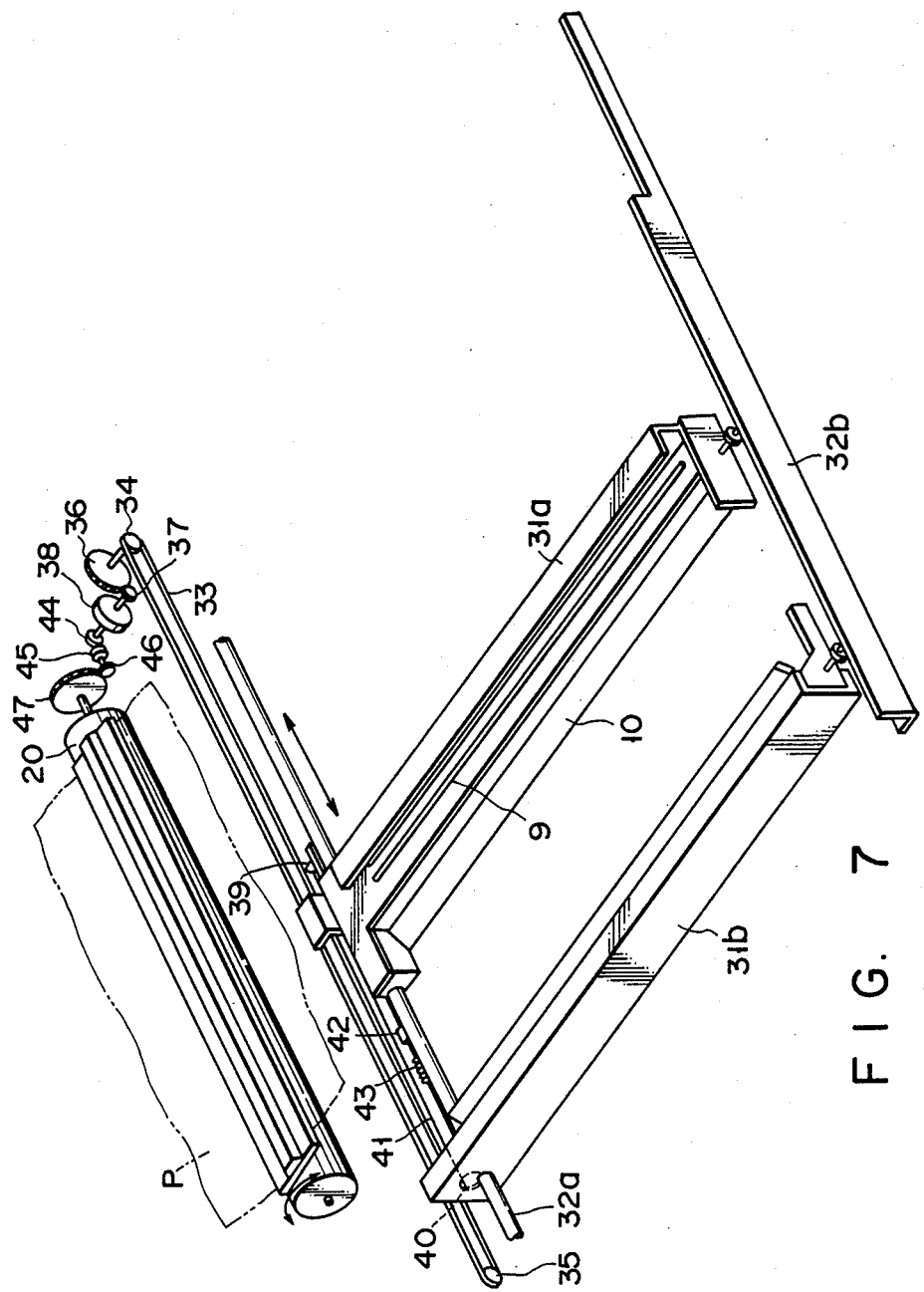
FIG. 7 is a perspective view of main part showing a driving unit of the optical system and a platen roller.

FIG. 7 shows a driver for the optical system and platen roller 20.

Light source 9 and mirror 10 (FIGS. 3 and 4) are arranged on first carriage 31a, whereas mirrors 11 and 12 (refer to FIGS. 3 and 4) are arranged on second carriage 31b. First and second carriages 31a and 31b are guided by guide rails 32a and 32b and can be moved parallel to each other. Endless belt 33 is arranged near guide rail 32a. First carriage 31a is fixed to an intermediate portion of endless belt 33. Both the end portions of belt 33 are hooked around pulleys 34 and 35. Of the pulleys, pulley 34 is rotated by pulse motor 38 through gears 36 and 37.

Pulleys 39 and 40 are rotatably arranged on first and second carriages 31a and 31b on the guide rail 32a side. Wire 41 is connected between pulleys 39 and 40. One end of wire 41 is fixed to stationary portion 42, and the other end of wire 41 is fixed to stationary portion 42 through coil spring 43. In this arrangement, when pulse motor 38 is rotated, first carriage 31a is moved upon rotation of belt 33. Upon this movement, second carriage 31b is also moved. In this case, since pulleys 39 and 40 serve as movable pulleys, second carriage 31b is moved at a speed $\frac{1}{2}$ that of first carriage 31a in the same direction. Note that the moving direction of first and second carriages 31a and 31b is controlled by changing the rotating direction of pulse motor 38.

The power of pulse motor 38 is transmitted to platen roller 20 through bevel gears 44 and 45, and gears 46 and 47. Accordingly, platen roller 20 is rotated in accordance with the operations of first and second carriages 31a and 31b.

A case wherein an image is printed on plain paper by using the image forming apparatus of the present invention will be described blow. In this case, ribbon cassette 52 is attached to thermal head 19.

Figure 8:
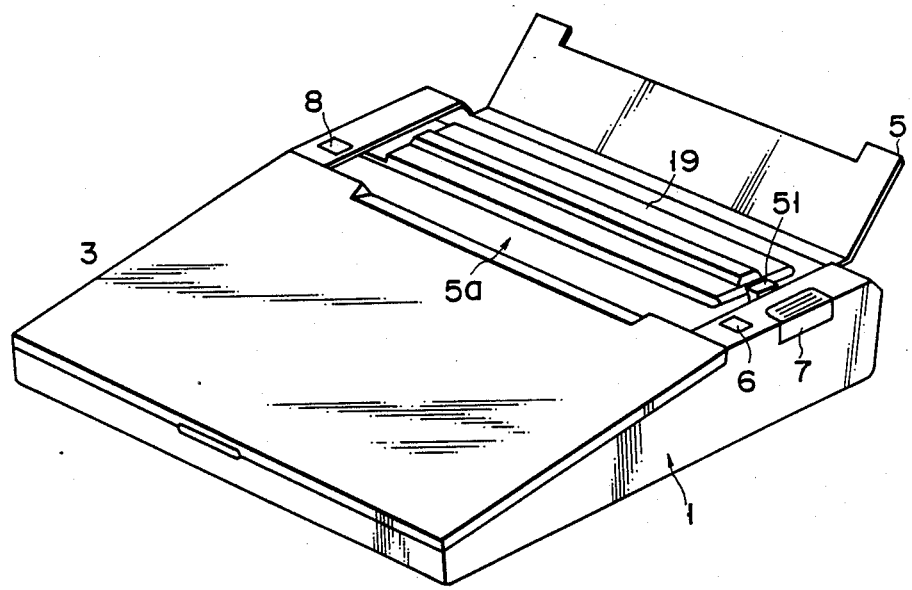
FIG. 8 is a perspective view showing a state wherein the cover is open in FIG. 1.
Figure 9:
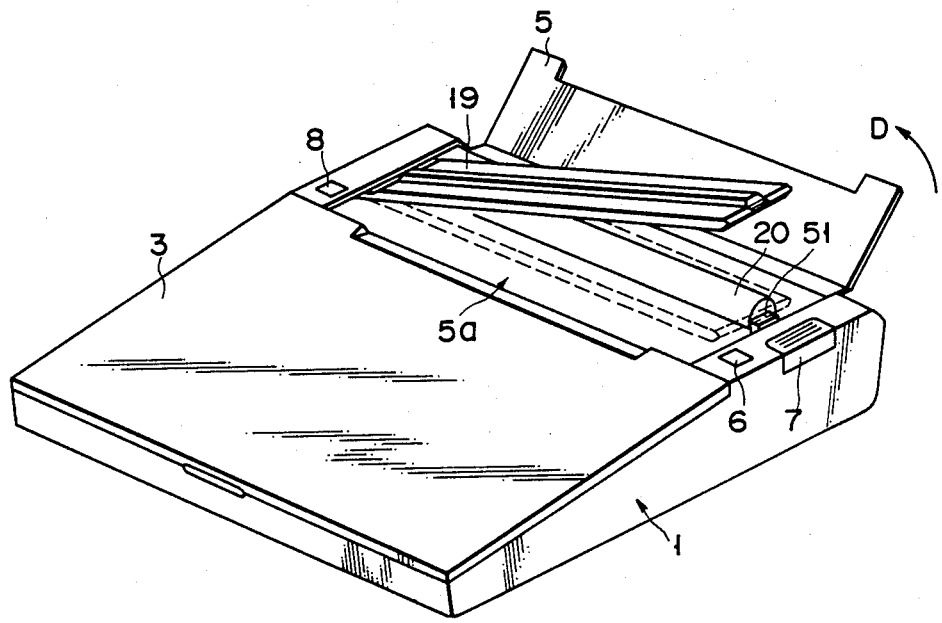
FIG. 9 is a perspective view showing a state wherein a thermal head is pivoted.
Figure 10:
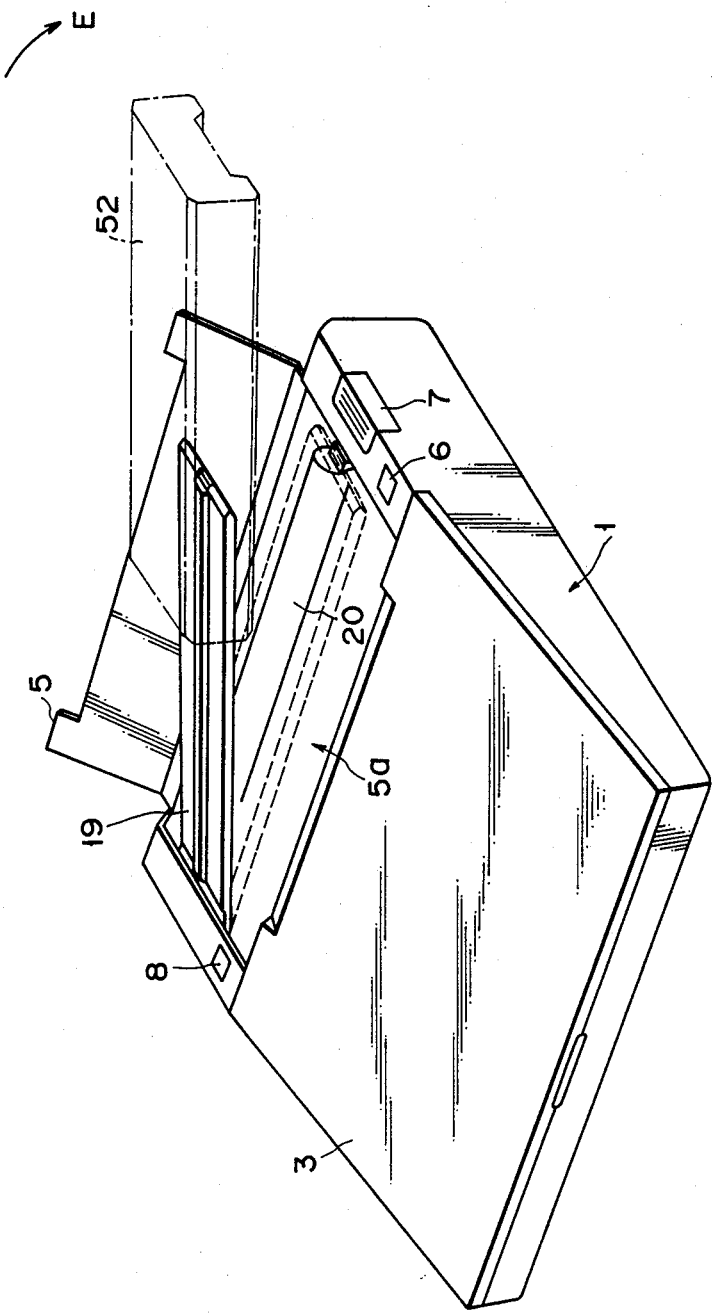
FIGS. 10 and 11 are perspective views each showing a state wherein a ribbon cassette is attached to the thermal head.
Figure 11:
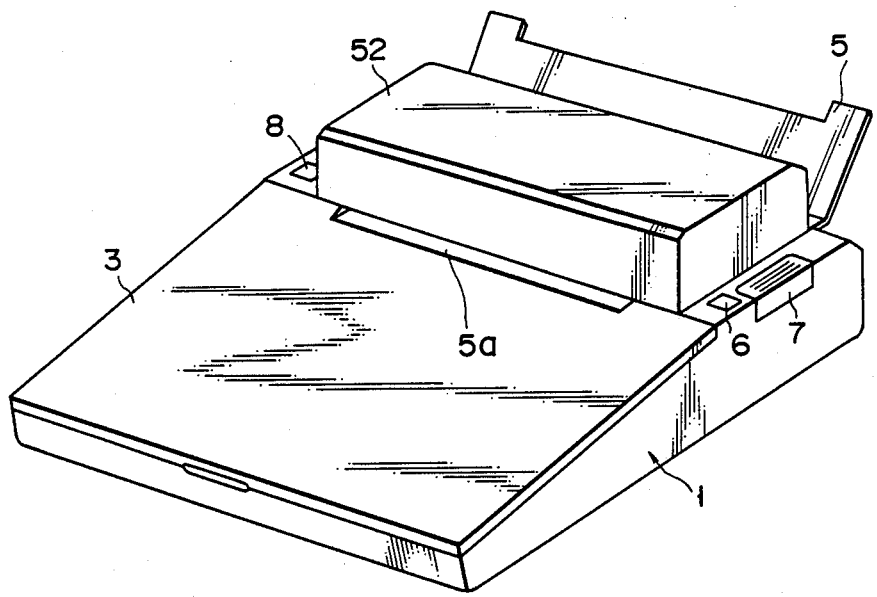
Figure 12:
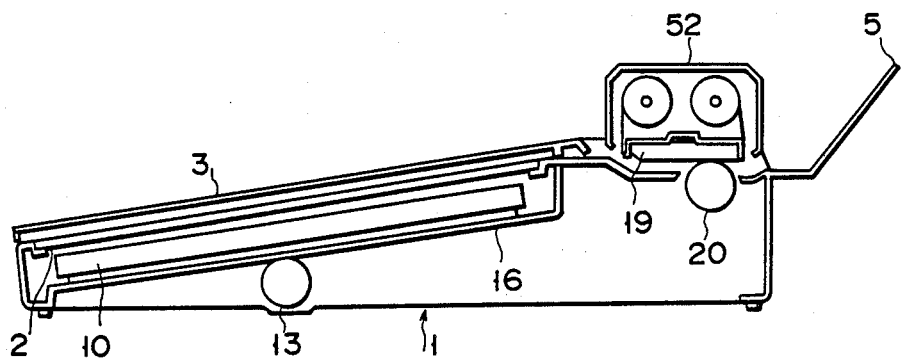
FIG. 12 is a side sectional view showing a state wherein the ribbon cassette is attached to the thermal head.

When operating member 7 is depressed while cover 5 is open as shown in FIG. 8, lock member 51 which locked one end of thermal head 19 is released from thermal head 19. The other end of thermal head 19 is pivotally supported so that when lock member 51 is released, read 19 can be pivoted in the direction indicated by arrow D in FIG. 9. In this state, ribbon cassette 52 is attached from the side of one end of thermal head 19 as shown in FIG. 10, and then they are integrally pivoted in the direction indicated by arrow E in FIG. 10. With this operation, thermal head 19 is locked by lock member 51 again, and ribbon cassette 52 is attached to head 19, as shown in FIGS. 11 and 12. Ribbon cassette 52 is detachable from thermal head 19 when pulled upward therefrom.

Figure 13:
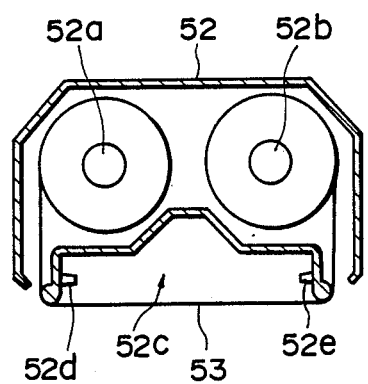
FIG. 13 is a side sectional view showing an arrangement of the ribbon cassette.

FIG. 13 shows ribbon cassette 52. Ink ribbon 53 which is wound around bobbins 52a and 52b at its both ends is stored in cassette 52. As ink ribbon 53, a monochrome ink ribbon containing only black ink or a specific one of other color inks is used, or a full-color ink ribbon having a size slightly larger than the maximum size of paper to be printed and containing, e.g., yellow ink, magenta ink, cyan ink, and black ink (not shown) which are arranged in this order is used. A type of ink ribbon stored in cassette 52 can be detected by a known method. For example, a plurality of projections representing code data corresponding to the type of ink ribbon are formed on one side surface of cassette 52, and are detected by a cassette sensor (to be described later) constituted by, e.g., microswitches, which is mounted on apparatus body 1.

Recess portion 52c in which head 19 is fitted is formed in cassette 52. Projections 52d and 52e on which head 19 is fitted are formed on recess portion 52c.

Figure 14:
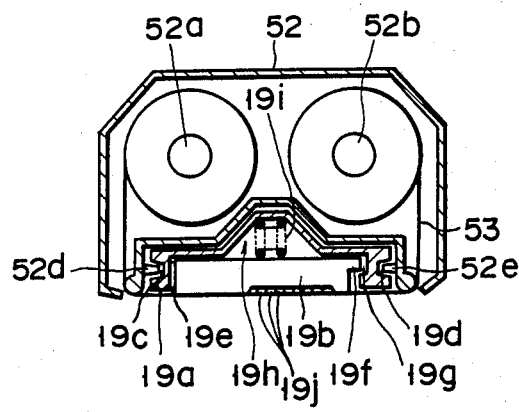
FIG. 14 is a side sectional view showing a state wherein the ribbon cassette is attached to the thermal head.

FIG. 14 shows a state wherein cassette 52 is attached to head 19. Thermal head 19 is constituted by head box 19a, head base 19b, and the like. Grooves 19c and 19d to be fitted on projections 52d and 52e formed on recess portion 52c (FIG. 13) of cassette 52 are formed in the outer surface of head box 19a. In addition, a plurality of heating resistor elements 19j are arranged on head base 19b, and one end thereof in the transverse direction is attached to head box 19a through, e.g., elastic member 19e. Projection 19f is formed on the other end of head base 19b in the transverse direction. Projection 19f is loosely engaged with recess 19g formed in head box 19a. With this arrangement, head base 19b is engaged with head box 19a so as to be slightly pivotal.

Figure 15:
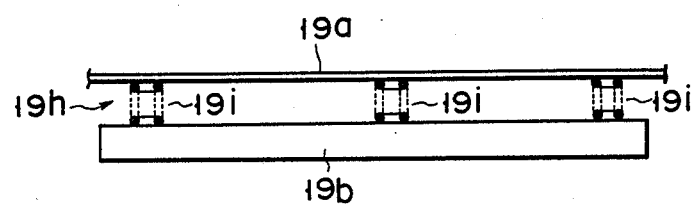
FIG. 15 is a side sectional view showing biasing means of the thermal head.

Housing portion 19h is formed at the central portion of head box 19a in the longitudinal direction. As shown in FIG. 15, coil springs 19i are housed at equal intervals in housing portion 19h at the both ends and the center of head base 19b in the longitudinal direction. Therefore, the respective portions of head base 19b are brought into contact with platen roller 20 by coil springs 19i substantially with a uniform pressure. Instead of coil springs 19i, other flexible elements such as leaf springs are also used.

Figure 16:
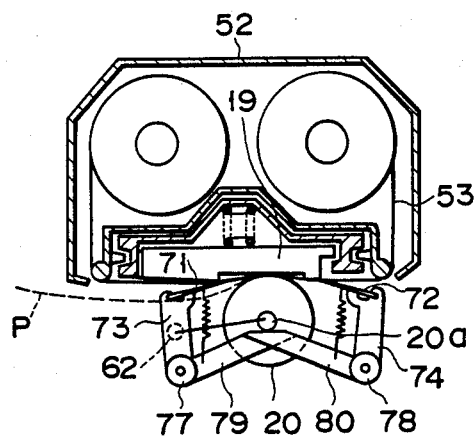
FIGS. 16 and 17 are views each showing a relationship between the platen roller and the press members.

FIG. 16 shows an arrangement of platen roller 20. As described above, platen roller 20 can be brought into contact with or separated from thermal head 19. More specifically, roller 20 is in contact with head 19 in a ready state prior to printing and during printing, as shown in FIG. 16. However, in full-color printing, when printing in one color is finished and the next ink is moved to a start position of printing, roller 20 is separated from head 19, as shown in FIG. 17.

Figure 18:
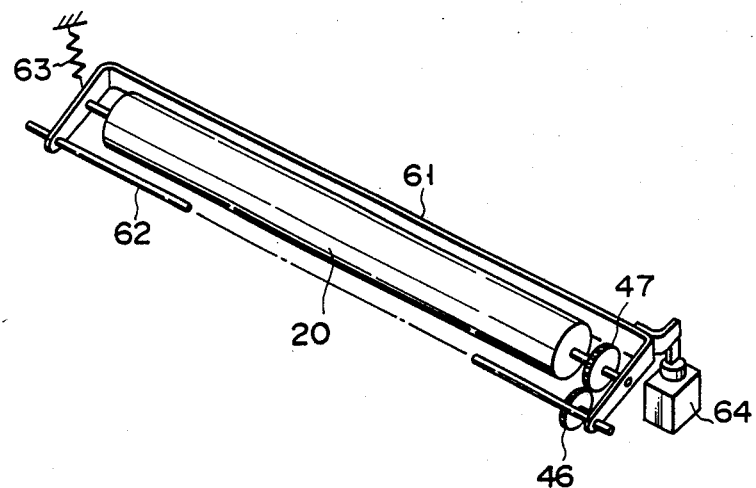
FIG. 18 is a perspective view of main part showing a moving unit of the platen roller.

FIG. 18 shows a moving unit of platen roller 20. Platen roller 20 and gears 46 and 47 for driving roller 20 are rotatably held by U-shaped hold member 61. Shafts 62 are attached to the opposite end portions of hold member 61. Shafts 62 serve as the fulcrums on which hold member 61 can be freely pivoted. Spring 63 for biasing roller 20 toward head 19 is attached to one end portion of hold member 61 in the longitudinal direction. Solenoid plunger 64 for separating hold member 61 from head 19 against the biasing force of spring 63 is attached to the other end portion of hold member 61 in the longitudinal direction.

Figure 19:
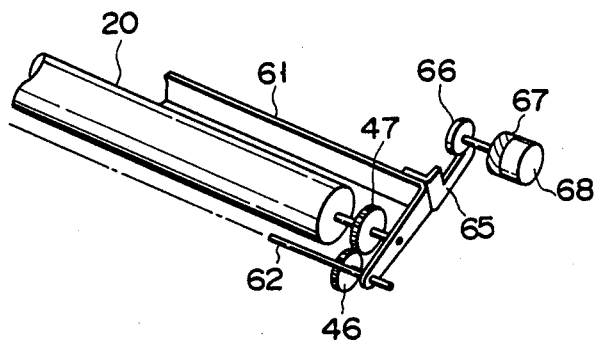
FIG. 19 is a perspective view showing a moving unit of the platen roller according to another embodiment.

FIG. 19 shows a moving unit according to another embodiment. The same reference numerals in FIG. 9 denote the same parts as in FIG. 18. In the abovedescribed embodiment, hold member 61 is driven by solenoid plunger 64. In this embodiment, however, projection 65 is formed on the other end portion of hold member 61 in the longitudinal direction, and cam 66 is brought into contact with projection 65. Cam 66 is driven by motor 68 through reduction gear mechanism 67. With this arrangement, roller 20 can be moved in the same manner as in the above embodiment.

Figure 17:
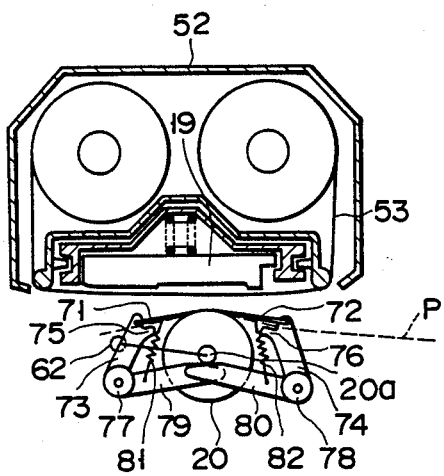

As shown in FIGS. 16 and 17, plate-like press members 71 and 72 are arranged near roller 20 so as to restrict the motion of paper P in association with an operation of roller 20.

Figure 20:
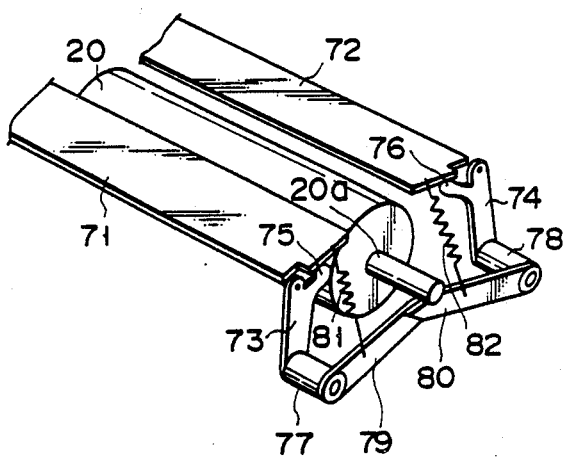
FIG. 20 is a perspective view of main part showing an arrangement of the press members.

FIG. 20 shows an arrangement of press members 71 and 72. Press members 71 and 72 are arranged along roller 20. Moving units for members 71 and 72 are mounted on their two end portions. Although FIG. 20 shown only the moving unit mounted on one end portion of members 71 and 72, an identical unit is mounted on the other end portion of members 71 and 72.

The proximal ends of press members 71 and 72 are pivotally supported on the distal ends of support members 73 and 74. Contact portions 75 and 76 are formed on the distal ends of support members 73 and 74. Press members 71 and 72 are brought into contact with contact portions 75 and 76 so as to be separated from roller 20. The proximal ends of support members 73 and 74 are fixed to pivot shafts 77 and 78 which are pivotally arranged near roller 20. The proximal ends of levers 79 and 80 are fixed on pivot shafts 77 and 78. With this arrangement, levers 79 and 80, and support members 73 and 74 can be integrally actuated. In addition, support members 73 and 74 are always biased by a spring (not shown) in a direction in which their distal ends are separated from each other. The distal ends of levers 79 and 80 can be brought into contact with shaft 20a of roller 20. Furthermore, springs 81 and 82 are connected across intermediate portions of levers 79 and 80, and distal end portions of press members 71 and 72. Press members 71 and 72 are always biased by springs 81 and 82 toward contact portions 75 and 76.

In the above arrangement, platen roller 20 is in contact with thermal head 19 in a ready state prior to printing and during printing, as shown in FIG. 16. In this state, since shaft 20a of roller 20 is moved above pivot shafts 77 and 78, support members 73 and 74 are moved in a direction in which their distal ends are separated from each other. Consequently, the distal ends of press members 71 and 72 are separated from roller 20.

In the above state, when paper P is inserted from insertion port 5a shown in FIG. 2, the leading edge of paper P is moved along the the lower surface of press member 71 and is set between roller 20 and ink ribbon 53.

In full-color printing, when printing in one color is completed, platen roller 20 is separated from thermal shown in FIG. 17, and then levers 79 and 80 are pushed downward by shaft 20a of roller 20. As a result, support members 73 and 74 are pivoted in a direction in which their distal ends come close to each other, and the distal ends of press members 71 and 72 are brought into contact with the surface of roller 20, thereby holding paper P. At this time, press members 71 and 72 are separated from contact portions 75 and 76 of support members 73 and 74, and paper P is held by the biasing force of springs 81 and 82.

Figure 21:
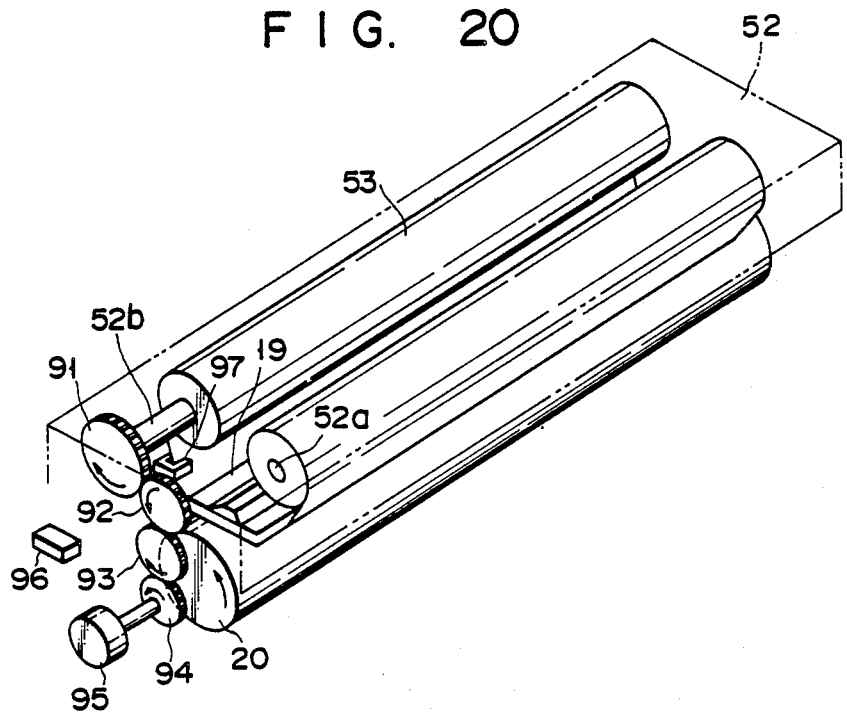
FIG. 21 is a perspective view of main part showing a driver of an ink ribbon.

FIG. 21 shows a driving section of ink ribbon 53. Gear 91 is mounted on bobbin 52b of ribbon cassette 52. Gears 92 and 93 are sequentially meshed with gear 91. Gears 91 to 93 are housed in, e.g., cassette 52. When cassette 52 is attached to thermal head 19, gear 93 is meshed with gear 94 arranged in apparatus body 1.

Gear 94 is rotated by pulse motor 95, which drives ink ribbon 53.

Cassette sensor 96 constituted by a plurality of microswitches is attached to apparatus body 1. Code data consisting of a plurality of projections which are formed on the outer surface of ribbon cassette 52 and adapted to represent a type of ink ribbon is read by cassette sensor 96.

Figure 22:
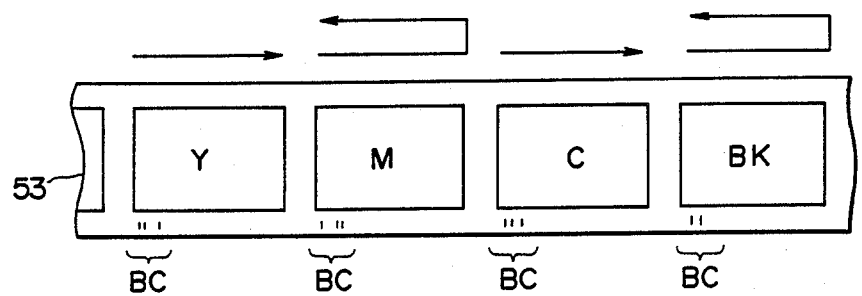
FIG. 22 is a plan view showing a full color ink ribbon.

In addition, ribbon sensor 97 for detecting a type of ink is arranged in apparatus body 1 midway along the conveying path of ink ribbon 53. Ribbon sensor 97 is constituted by, e.g., a known photocoupler. Ribbon sensor 97 detects code data BC consisting of bar codes which are formed on one edge of the full-color ink ribbon so as to correspond to inks of the respective colors as shown in FIG. 22.

Figure 23:
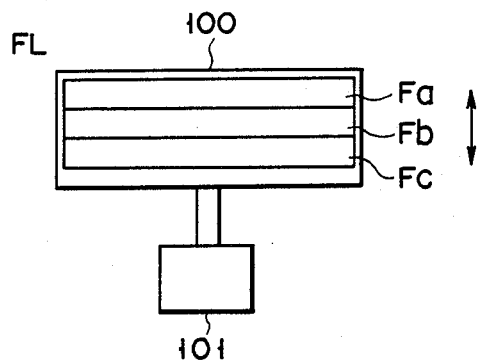
FIG. 23 is a front view showing a filter unit according to an embodiment.

FIG. 23 shows filter unit FL which is used when full-color printing is to be performed. Filters Fa, Fb, and Fc for a plurality of colors corresponding to the colors of ink in ink ribbon 53 are vertically arranged in, e.g., frame member 100. The order of arrangement of filters Fa to Fc coincides with the order of arrangement of inks in ink ribbon 53. For example, solenoid plunger 101 capable of setting the position of filter unit FL in a stepwise manner is attached to frame member 100. When full-color printing is to be performed, filters Fa to Fc are sequentially inserted in the optical path of image sensor 14 in accordance with the colors of inks in ink ribbon 53 by using solenoid plunger 101. With operation, a document is exposed/scanned in units of colors of filters Fa to Fc. In other words, a document image is converted by image sensor 14 into an electrical signal in units of light beams transmitted through filters Fa to Fc.

Note that the moving unit of filter FL is not limited to solenoid plunger 101, and may be constituted by, e.g., a cam/ratchet mechanism driven by a motor.

FIG. 24 shows an arrangement of a control system.

Control section 111 controls the overall image forming apparatus. Print key 6 and density setting section 8 constituted by a variable resistor are connected to control section 111. Light source 9 is connected to control section 111 through driver 112. Image sensor 14 and thermal head 19 are connected to control section 111 through amplifier 113 and head driver 114, respectively.

Furthermore, pulse motors 38 and 95 are connected to control section 111 through motor driver 115. Solenoid plungers 64 and 101 are connected to control section 111 through solenoid driver 116.

Moreover, buffer memory 117 for storing image data corresponding to a number of lines which is supplied from image sensor 14, cassette sensor 96 for detecting that ink ribbon 52 is attached and the type of this ribbon cassette, and ribbon sensor 97 for detecting a type of ink in a full-color ink ribbon are connected to control section 111.

An operation in the above-described arrangement will be described below.

An image forming operation when heat-sensitive paper is used will be described first. In this case, while a document is set on document table 2, paper, e.g., a heat-sensitive paper, is inserted from insertion port 5a. When print key 6 is operated in this state, driver 112 and motor driver 115 are controlled by control section 111, light source 9 is turned on, and pulse motor 38 is driven in the forward direction. Subsequently, first and second carriages 31a and 31b are moved from a home position shown in FIG. 5, and the document set on document table 2 is exposed/scanned. In accordance with this exposure/scanning operation, a document image is sequentially converted by image sensor 14 into electrical signals. In this way, image data to be printed are generated. Image data output from image sensor 14 are stored in buffer memory 117 through amplifier 113 and control section 111. The image data stored in buffer memory 117 in units of several lines are sequentially read out in unit of lines, and are supplied to thermal head 19 through control section 111 and head driver 114.

The paper inserted into insertion port 5a is moved by platen roller 20 which is rotated by pulse motor 38 in synchronism with first and second carriages 31a and 31b. At this time, an image corresponding to the document image is printed by thermal head 19. After the exposure/scanning operation of the document and the printing by thermal head 19 are completed, the paper is discharged outside apparatus body 1. Thereafter, pulse motor 38 is reversely rotated, and first and second carriages 31a and 31b are restored to the home position.

A printing operation using a ribbon cassette will be described below.

When printing is to be performed by using a ribbon cassette, operating member 7 of apparatus body 1 is operated while cover 5 is open, so that thermal head 19 is released and ribbon cassette 52 is attached to head 19. Then, head 19 is closed again to integrally attach ribbon cassette 52 to apparatus body 1.

In this state, paper is inserted from insertion port 5a, a document is set on document table 2, and print key 6 is operated. At this time, control section 111 detects that the cassette is attached by receiving an output from cassette sensor 96, and discriminates the type of ribbon cassette 52. When it is discriminated that a monochrome ink ribbon is stored in ribbon cassette 52, a document image is exposed/scanned in the same manner as in the operation wherein the heat-sensitive paper is used. Subsequently, ink of ink ribbon 53 driven by pulse motor 95 is heated/melted by thermal head 19, and an image is formed on the paper.

When control section 111 discriminates that ink ribbon 53 stored in ribbon cassette 52 is for full-color printing, the following operation is performed.

First, pulse motor 95 is operated. While discriminating an output signal from ribbon sensor 97, control section 111 moves ink of a first color in ink ribbon 53 to a printing position. Subsequently, solenoid plunger 101 is operated, and filter Fa in filter unit FL corresponding to the first ink color is inserted in the optical path of image sensor 14. In this state, light source 9 is turned on, and the document is exposed/scanned in the same manner as described above. In accordance with this exposure/scanning operation, platen roller 20 and ink ribbon 53 are driven, and at the same time, thermal head 19 is operated in accordance with image data output from image sensor 14, thereby forming an image on the paper using the first ink.

When, for example, the first ink is yellow (y), the yellow ink is moved in the direction indicated by the arrow in FIG. 22, and printing is performed.

When the exposure/scanning operation of the document is completed, while first and second carriages 31a and 31b are stopped at the same position, solenoid plunger 64 is operated to separate platen roller 20 from thermal held 19. In this case, the paper is held on roller 20 by press members 71 and 72 so as not to be shifted. In this state, motor 95 is driven to transfer the second ink (magenta (M)), and a rear portion of the second ink is set at the start position of printing. In addition, solenoid plunger 101 is biased, and filter Fb corresponding to the color of the second ink is inserted in the optical path of image sensor 14.

In this state, solenoid plunger 64 is deenergized, and platen roller 20 is brought into contact with thermal head 19. Thereafter, light source 9 is turned on, and pulse motors 38 and 95 are reversely rotated to expose/scan the document in the reverse direction. At the same time, ink ribbon 53 and the paper are reversely conveyed, and an image is formed by using the second color ink.

In this way, a color image is formed on the paper while the paper is moving forward, and another color image on the paper while the paper is moving backward.

When the image forming operation using the second ink is completed in this manner, solenoid plunger 64 is is energized to separate platen roller 20 from thermal head 19, and the third ink (cyan (C)) is set at &he printing start position. In addition, solenoid plunger 101 is energized, and filter Fc corresponding to the color of the third ink is inserted in the optical path of image sensor 14. In this state, light source 9 is turned on, and motors 38 and 95 are rotated forwardly so as to expose/scan the document in the forward direction, thereby forming an image using the third ink.

Subsequently, an image forming operation using the fourth ink (black (BK)) is performed in the same manner as in the operation using the second ink. When this operation is finished, all the printing operations are completed.

Note that when inks of three colors are set in the ink ribbon, if an image forming operation using the third ink is finished, all the image forming operations are completed.

As described above, according to the present invention, mirror 12 is cut at a portion which does not influence the formation of an image. With this arrangement, light source 9, and mirrors 10, 11, and 12 constituting the optical system can be arranged so as to be inclined, and hence document table 2 can be inclined. Therefore, the size of apparatus body 1 can be reduced.

The optical system is constituted by light source 9, mirrors 10, 11, and 12, lens block 13, and image sensor 14 without using a color contact sensor as in the conventional apparatus. Therefore, the manufacturing cost can be decreased.

In addition, according to the present invention, platen 20 is arranged above thermal head 19. With this arrangement, paper as an image receiving member can be set from the front side with respect to insertion portion 5a formed in the upper surface of apparatus body 1. Therefore, setting of paper is facilitated as compared with the conventional apparatus wherein paper is set from the rear side of the platen roller. Moreover, since the paper can be conveyed in a substantially linear state, only, a small resistance is present in conveying the paper. When printing is performed by reciprocating paper especially in full-color printing, this arrangement can prevent any positional shift of the paper, and hence reduce color misregistration. Therefore, printing quality can be improved.

Furthermore, according to the present invention, plate-like press members 71 and 72 are arranged near platen roller 20. With this arrangement, when platen roller 20 is separated from thermal head 19, paper is urged against platen roller 20 by press members 71 and 72. Therefore, a space required to arrange parts can be reduced as compared with the conventional apparatus wherein paper is urged against the platen roller by a roller. Moreover, if press members 71 and 72 are used, since the urging position of the paper with respect to platen roller 20 can be set near the printing section of thermal head 19, an area in which printing cannot be performed can be reduced as compared with the case wherein a roller is used.

Furthermore, according to the present invention, when full color printing is to be performed, paper is reciprocated, and the optical system is reciprocated in accordance with the moving direction of the paper. Therefore, the number of times of moving paper can be decreased to half that in the conventional one-way printing wherein paper is restored to the printing start position every time a printing operation using one color is completed. Therefore, a positional shift of paper can be prevented and the printing speed can be increased.

In addition, according to the present invention, a plurality of springs 19i are arranged at equal intervals in head box 19a constituting thermal head 19, and head base 19b is urged by springs 19i toward platen roller 20. With this arrangement, the respective parts of thermal head 19 can be brought into contact with platen 20 with an equal pressure, and hence uneven printing can be prevented. Moreover, housing portion 19h for housing springs 19i of head box 19a is positioned between bobbins 52a and 52b of ribbon cassette 52. This arrangement can prevent an increase in size of ribbon cassette 52.

Moreover, according to the present invention, when full-color printing is to be performed, filters Fa to Fc in filter FL are sequentially inserted in the optical path of image sensor 14 in accordance with the colors of inks in ink ribbon 53. With this operation, an optical image input through filters Fa to Fc in subjected to photoelectrical conversion by image sensor 14. Thereafter, printing is performed by supplying the converted output to thermal head 19 without color image processing. Therefore, the cost can be greatly decreased as compared with the conventional apparatus wherein printing is performed after performing color image processing by using the color contact sensor.

Note that the present invention is not limited to the above-described embodiment, and various changes and modifications can be made within the spirit and scope of the invention.

What is claimed is:

1. An image forming apparatus for forming an image on an image carrier having a flat face, comprising:
   (a) means for generating image data;
   (b) means for conveying said image carrier;
   (c) means for forming said image on said image carrier in accordance with image data generated by said generating means, said forming means being detachably arranged above said conveying means;
   wherein said generating means includes means for scanning a document with light, at least two color filters for filtering the light reflected from the document so as to get components of the light corresponding to said color filters.

2. The apparatus according to claim 1, wherein said image carrier is moved to the rear of said apparatus from the front of said apparatus after said forming means has formed said image on said image carrier.

3. The apparatus according to claim 1, further comprising means for urging said forming means onto said conveying said substantially with a uniform pressure.

4. The apparatus according to claim 3, wherein said forming means includes a heat-generating member, and said urging means urges the heat-generating member onto said conveying means substantially with the uniform pressure.

5. The apparatus according to claim 1, wherein said forming means has an ink-ribbon cassette means for plain paper printing, said cassette means detachable from said forming means when pulled upward therefrom.

6. An image forming apparatus for forming an image on an image carrier having a flat face, comprising:
 (a) means for generating image data;
 (b) means for conveying said image carrier;
 (c) means for forming said image on said image carrier in accordance with said image data generated by said generating means, said forming means being detachably arranged above said conveying means; and
 (d) means for scanning a document with light, said scanning means including means for guiding the light reflected from the document, said guiding means having a non-reflected portion a part of which has been cut.

7. An image forming apparatus for forming an image on an image carrier having a flat face, comprising:
 (a) means for generating image data;
 (b) means for conveying said image carrier;
 (c) means for forming said image on said image carrier in accordance with said image data generated by said generating means, said forming means being detachably arranged above said conveying means; and
 (d) means for scanning a document with light, said scanning means including means for guiding the light reflected from the document, said guiding means having a cut portion near the bottom of said apparatus.

8. An apparatus for forming a color image of a document on an image carrier, comprising:
 conveying means for conveying said image carrier;
 scanning means for scanning said document with light;
 filter means, constituted by at least comprising two color filters, for filtering the light reflected from said document;
 selecting means for selecting one of said color filters by moving said color filters up and down;
 converting means for converting the light from the one of said color filters selected by said selecting means into an electrical signal;
 forming means for forming said color image is accordance with said electrical signal from said 9. The apparatus according to claim 8, further comprising means for scanning a document with light, said scanning means including means for guiding the light reflected from the document, said guiding means having a non-reflected portion a part of which has been cut.

10. The apparatus according to claim 8, further comprising means for urging said forming means onto said conveying means substantially with a uniform pressure.

11. The apparatus according to claim 10, wherein said forming means includes a heat-generating member, and said urging means urges the heat-generating member onto said conveying means substantially with the uniform pressure.

12. The apparatus according to claim 8, wherein said conveying means conveys said image carrier back and forth, thereby to form a color image on said image carrier while said image carrier is moving forward, and another color image on said image carrier while said image carrier is moving backward.

13. An apparatus for forming a color image of a document on an image carrier, comprising:
 means for scanning the document so as to generate color image data;
 means for conveying the image carrier back and forth; and
 means, responsive to said color image data generated by said scanning means, for forming the color image on said image carrier while said image carrier is moving forward, and another color image on said image carrier while said image carrier is moving backward.

* * * * *